(12) United States Patent
Klingebiel et al.

(10) Patent No.: US 9,555,690 B2
(45) Date of Patent: Jan. 31, 2017

(54) HEATING DEVICE COMPOSED OF HEATING MODULES, AND HEATING MODULE FOR SAME

(71) Applicant: BorgWarner BERU Systems GmbH, Ludwigsburg (DE)

(72) Inventors: Andreas Klingebiel, Marbach am Neckar (DE); Stephan Weinhold, Stuttgart (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 259 days.

(21) Appl. No.: 14/283,538

(22) Filed: May 21, 2014

(65) Prior Publication Data
US 2014/0348494 A1 Nov. 27, 2014

(30) Foreign Application Priority Data
May 23, 2013 (DE) .......... 10 2013 105 285

(51) Int. Cl.
*B60H 1/00* (2006.01)
*B60H 1/22* (2006.01)
*F24H 3/10* (2006.01)
*H05B 3/08* (2006.01)
*H05B 3/24* (2006.01)
(Continued)

(52) U.S. Cl.
CPC .......... *B60H 1/2225* (2013.01); *F24H 3/0429* (2013.01); *F24H 3/0435* (2013.01); *F24H 3/0458* (2013.01); *F24H 9/1872* (2013.01); *H05B 3/24* (2013.01); *B60H 2001/2271* (2013.01); *F24H 3/0447* (2013.01); *H05B 2203/023* (2013.01)

(58) Field of Classification Search
None
See application file for complete search history.

(56) References Cited

U.S. PATENT DOCUMENTS 5,471,034 A * 11/1995 Kawate ............... B60H 1/2225
219/483
5,854,471 A 12/1998 Tadokoro et al.
(Continued)

FOREIGN PATENT DOCUMENTS

DE 691 00 740 T2 3/1994
DE 100 50 429 A1 4/2002
(Continued)

*Primary Examiner* — Joseph M Pelham
(74) *Attorney, Agent, or Firm* — Bose McKinney & Evans LLP

(57) ABSTRACT

The invention relates to a heating device for heating the interior of a motor vehicle, comprising a plurality of heating modules arranged in at least one heating unit, each heating module comprising at least one heating resistor, at least one heat exchanger configured for delivering heat generated by the heating resistor to an airflow, and a rectangular frame surrounding the at least one heating resistor and the at least one heat exchanger, each frame having openings in opposed frame legs, wherein in the at least one heating unit the frame legs, comprising openings, of adjacent heating modules face one another and electrical connection elements reaching through the openings electrically connect the heating modules to one another.

13 Claims, 3 Drawing Sheets

(51) Int. Cl.
*F24H 3/04* (2006.01)
*F24H 9/18* (2006.01)

(56) References Cited

U.S. PATENT DOCUMENTS

| | | | |
|---|---|---|---|
| 8,637,796 B2* | 1/2014 | Bohlender | B60H 1/2221 219/202 |
| 9,375,993 B2* | 6/2016 | Bytzek | B60H 1/00 |
| 2005/0072774 A1 | 4/2005 | Bohlender | |
| 2006/0087398 A1* | 4/2006 | Wu | H05B 3/141 338/22 R |
| 2012/0312029 A1* | 12/2012 | Brehm | F24H 3/0429 62/3.3 |
| 2014/0217086 A1* | 8/2014 | Bytzek | H05B 3/26 219/478 |

FOREIGN PATENT DOCUMENTS

| | | |
|---|---|---|
| DE | 10 2010 048 593 A1 | 4/2012 |
| EP | 0 464 955 B1 | 12/1993 |
| EP | 2 131 117 A1 | 12/2009 |
| WO | WO 2013/053807 A1 | 4/2013 |

* cited by examiner

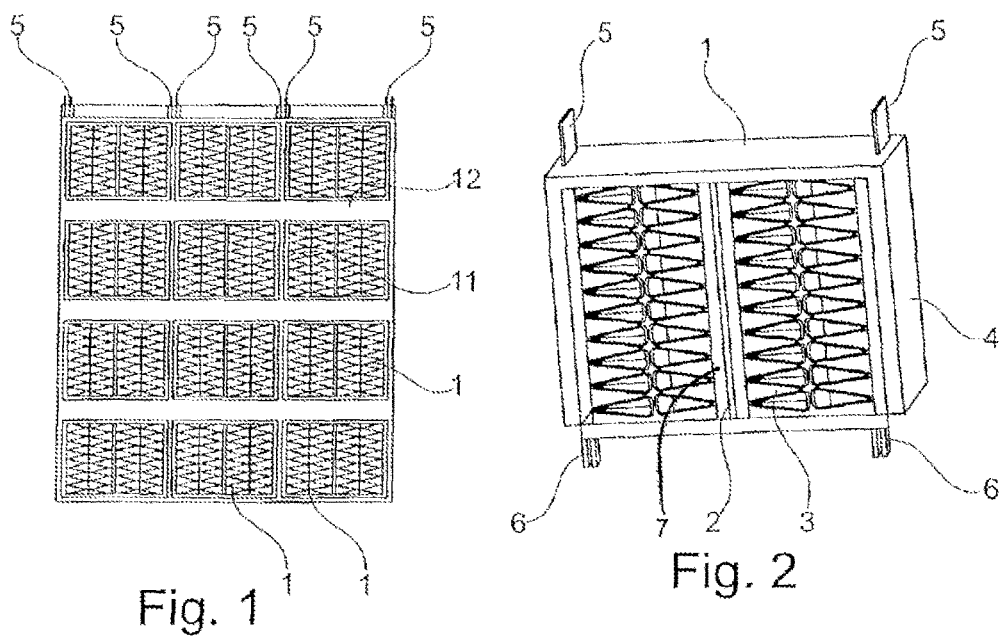

HEATING DEVICE COMPOSED OF HEATING MODULES, AND HEATING MODULE FOR SAME

RELATED APPLICATIONS

This application claims priority to DE 10 2013 105 285.1, filed May 23, 2013, which is hereby incorporated herein by reference in its entirety.

BACKGROUND

The present invention relates to a heating device for heating the interior of a motor vehicle.

Heating devices of this type are required in different sizes and strengths and are known from EP 0 464 955 B 1. The adaptation of the heater size to the respective installation space is generally associated with high fixed costs. Tools specific to the application are required, for example for adaptation of the length of heating rods, conductive tracks and contact frames.

To heat the interior of a vehicle, a number of heating devices are often used so that warm air can be introduced into the vehicle interior at different locations. This is associated with considerable costs, in particular if the individual heating devices differ in terms of their sizes or heat output.

SUMMARY

The present invention provides comfortable heating for the interior of a motor vehicle at lower cost, and in particular, provides heating for installation spaces ranging from an individual air outlet to a central heater for minivans.

A heating device according to this disclosure for heating the interior of a motor vehicle has one or more heating units, each of which is composed of one or more heating modules. The size and power of the heating device can therefore be adapted with minimal effort to specific requirements of a vehicle manufacturer, specifically since the number of heating modules is selected accordingly. Manufacturing and logistical costs can be reduced by manufacturing heating modules in large numbers and by using these for the production of different heating devices, for example for a headrest heater having a heating power of just 200 W and for an auxiliary heater having a power of 2000 W. Individual heating modules may also be provided passively in order to save costs, that is, without heating element and without heat exchanger.

A heating module according to this disclosure contains one or more heating resistors and one or more heat exchangers in order to deliver heat generated by the heating resistor or the heating resistors to an airflow. The heating resistor(s) and the heat exchanger(s) are surrounded by a rectangular frame of the heating module, which for example may be made economically of plastic. For purposes of this disclosure, the term "rectangular" should be understood as referring to a structure generally resembling a rectangular shape or being at least substantially, if not exactly, rectangular.

For connecting such a heating module to another heating module or a voltage source, the frame has openings in opposed frame legs for electrical connection elements. The frame legs, comprising openings, of adjacent heating modules face one another in each heating unit, and adjacent heating modules of the heating unit are electrically connected to one another by electrical connection elements, which pass through the openings in the frame legs.

For example, a sheet metal strip can be used as a connection element. The strip is inserted into an opening of a frame leg, exits from the opening of the oppositely arranged frame leg and enters an opening of the frame of a further heating module. A sheet metal strip can thus contact all heating modules of a heating unit. A first sheet metal strip is then sufficient as a potential connection, and a second sheet metal strip is then sufficient as an earth connection for a heating unit.

Instead of using as connection elements separate sheet metal strips, which contact all heating modules of a heating unit, connection elements can also be integrated in the heating modules, for example in that each module has at least two male plug contacts, which protrude from a first leg of the frame. Female plug contacts can be arranged in a second leg of the frame, said second leg being arranged opposite the first leg, and fit the male plug contacts. Heating modules can thus be plugged together to form a heating unit of any size, without the need for additional components for this purpose.

Female plug contacts can be arranged in the openings of a frame leg, for example as sockets. Female plug contacts may also be formed as connection elements which protrude from openings in the frame leg.

In an advantageous refinement of this disclosure, the heating resistors of the heating modules may be ceramic heating resistors, for example PTC heating resistors.

In a further advantageous refinement of this disclosure, the at least one heating element of each heating module is electrically contacted via the heat exchanger(s). In other words, each heating element is then electrically connected to one of the connection elements via the heat exchanger(s). Here, it is not necessary for the heat exchanger to contact the heating element directly, for example a contact plate can be arranged between the heating element and heat exchanger. However, the heating current flows through the heat exchanger to the heating resistor or from the heating resistor to the heat exchanger.

In a further advantageous refinement of this disclosure, each heating element of each heating module is arranged between two heat exchangers of the heating module. Heat generated by the heating resistor can thus be dissipated on two sides to an airflow.

If the heating modules contain a plurality of heating resistors, these are preferably arranged next to each other, for example between two heat exchangers. If one layer of heating elements is not sufficient for a desired heating power, it is usually more favorable to use more heating modules for a heating device than to provide a further layer of heating elements in a heating module.

In a further advantageous refinement of this disclosure, all heating modules of the heating device are surrounded by an overall frame. The overall frame can advantageously increase the mechanical stability of the heating device and can hold the heating modules together. The overall frame preferably has webs, which divide the space surrounded by it into compartments, in each of which a heating unit is arranged. Each web of the overall frame is then located between adjacent heating units. The mechanical stability can thus be improved even further.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIG. 1 shows a schematic illustration of a heating device with twelve heating modules;

FIG. 2 shows a heating module of the heating device;

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure. Further, it should be understood that various structural terms used throughout this disclosure and claims should not receive a singular interpretation unless it is made explicit herein. For example, the term "a heating module" should be interpreted to mean one or more heating modules; similarly, the term "heat exchanger" should be interpreted to mean one or more heat exchangers. All other terms used in this disclosure and claims should be similarly interpreted as meaning one or more unless it is made explicit in this document that a singular interpretation is intended.

The heating device illustrated in FIG. 1 is used to heat an interior of a motor vehicle and thus heats an airflow during operation. The heating device is composed of a plurality of identical heating modules 1 and contains a number of heating units. Each heating unit has at least two electrical connection elements 5, typically exactly two connection elements 5, and can thus be activated independently of the other heating units.

In the embodiment shown the heating device has three heating units, which each consist of four heating modules 1. The number of heating modules 1 and the number of heating units is a design variable and is selected in accordance with the requirements for a given application.

Figure 2A:
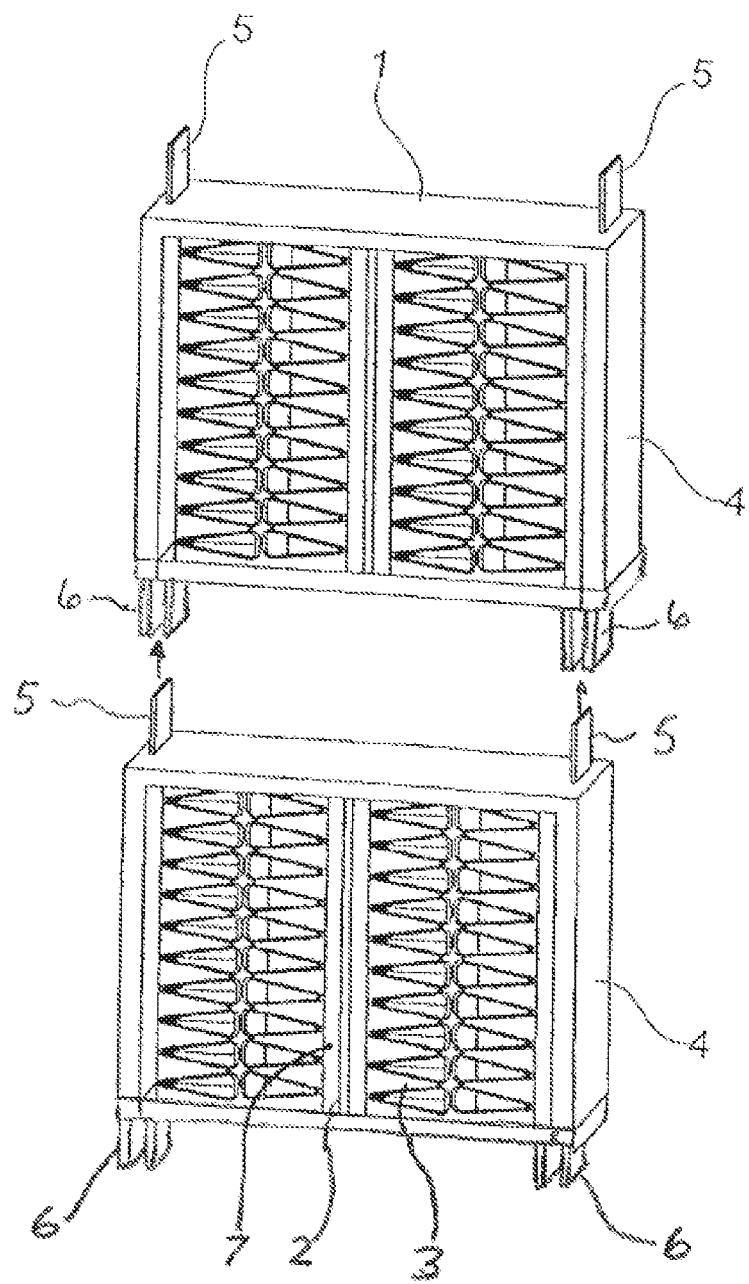
FIG. 2a shows two adjacent heating modules and the connection between the male and female plug contacts.

An example of such a heating module 1 is illustrated in FIG. 2. The heating module 1 contains at least one heating element or resistor 2, e.g., a ceramic PTC heating resistor, for example based on barium titanate. The heating resistor 2 or the heating resistors can be arranged between two heat exchangers 3, which deliver heat generated by the heating resistor 2 to an airflow. The heat exchangers 3 can consist of corrugated sheet metal or of sheet metal that is bent in a meandering manner, for example of aluminium. The at least one heating resistor 2 and the at least one heat exchanger 3 are surrounded by a rectangular frame 4, which can be made of plastic.

The heating resistor 2 can be arranged between two contact plates 7. The heating resistor 2 in the embodiment rests via one contact side against one of the two contact plates 7 and via the other contact side against the other contact plate 7. Each contact plate 7 may be part of one of the heat exchangers 3 or may be arranged as a separate component between one of the heat exchangers 3 and the heating resistor 2 or the heating resistors. The contact plates 7 may have openings, with which the heat exchangers engage.

The heating current flows during operation through the heat exchangers 3. The heating element 2 or the heating elements 2 are thus electrically contacted via the heat exchangers 3. The use of contact plates 7 to contact the at least one heating element 2 leads to a larger contact area than would be possible by direct contact to heat exchangers 3 formed from corrugated sheet metal or sheet metal bent in a meandering manner.

The frame 4 has openings for electrical connection elements on two mutually opposed frame legs. In the illustrated embodiment male plug contacts 5 are provided as connection elements and protrude from openings in a frame leg. On an opposed frame leg, the heating module 1 has female plug contacts 6, fitting the plug contacts 5. A heating unit can be connected to a voltage source via the plug contacts 5 of the first heating module 1 of said heating unit. The plug contacts 5 of the second and each further heating module 1 of a heating unit plug into the plug contact sockets 6 in the previous heating module 1 of said heating unit. If a heating unit is activated, current thus always flows through all of the heating modules 1 thereof.

Similarly to the male plug contacts 5, the female plug contacts 6 can also protrude from openings in the frame, as is illustrated in FIG. 2, or for example can be arranged as sockets in the frame 4. The plug contacts 5 can be formed as contact tongues. The plug contacts 5 are preferably formed as end portions of a sheet metal strip, which runs parallel to a frame leg in the space surrounded by the frame 4 and which a heat exchanger 3 abuts. This sheet metal strip may have openings, with which the heat exchanger 3 engages.

Figure 3:
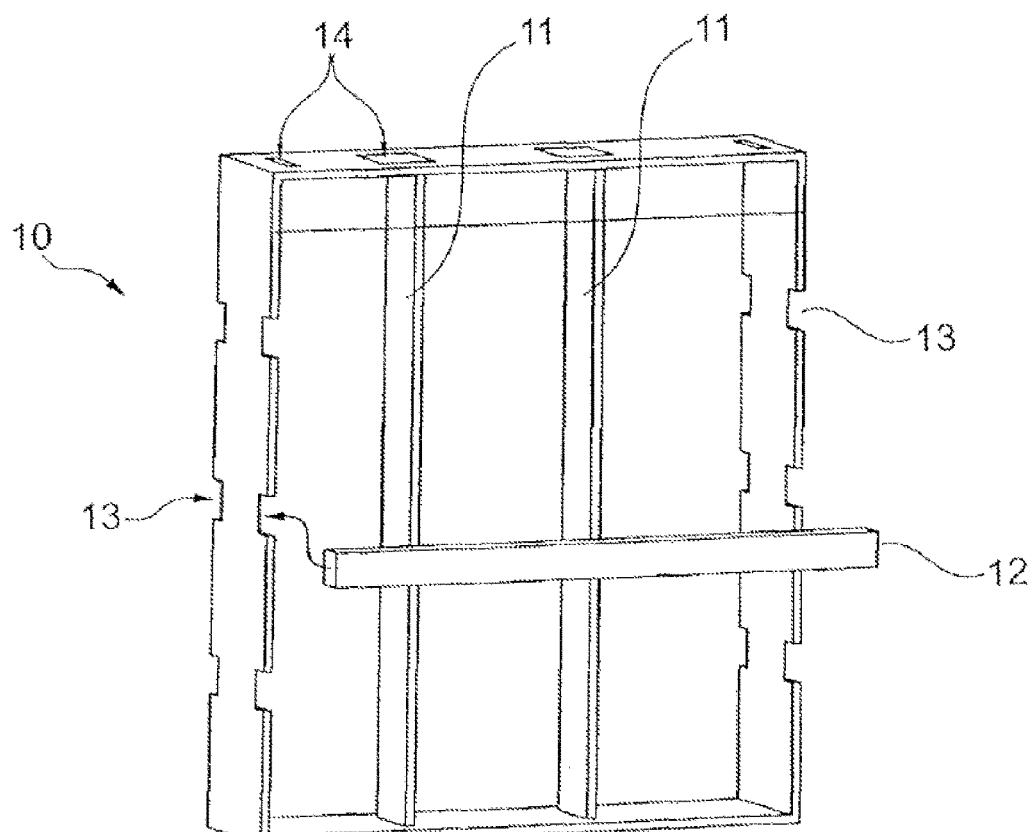
FIG. 3 shows a frame of the heating device.

The individual heating modules 1 are plugged together to form heating units. The heating units thus formed are held in an overall frame 10 of the heating device, which is illustrated in FIG. 3. The overall frame 10 of the heating device can be manufactured cost-effectively from plastic and has openings 14 in one of its legs for connection elements of the heating units, for example for the plug contacts 5 of the first heating module 1 of a heating unit.

Depending on the number of heating units, the overall frame 10 has a plurality of webs 11, which divide the space surrounded by the overall frame 10 into individual compartments, each of which is provided to receive a heating unit. In the assembled heating device, each web 11 of the overall frame 10 is arranged between two adjacent heating units. The webs 11 can be formed integrally with the overall frame 10. The webs 11 between adjacent heating units are longitudinal webs in the illustrated embodiment.

In addition to the webs 11, which are arranged between adjacent heating units, the overall frame 10 may have further webs 12, which run transversely to the webs 11 between the heating units. The further webs 12 can further increase the mechanical stability of the overall frame and cover contact points between adjacent heating modules 1 of a heating unit. The overall frame 10 can have, on opposite legs, recesses 13 in which the further webs 12 sit. The webs 12 can be bonded or welded for example to legs of the overall frame 10.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS 1 heating module
2 heating resistor
3 heat exchanger 4 frame
5 male plug contact
6 female plug contact
7 contact plates
10 overall frame
11 web
12 web
13 recess

What is claimed is:

1. A heating device for heating the interior of a motor vehicle, comprising:
    a plurality of heating modules arranged in a heating unit, each heating module comprising a heating resistor, a heat exchanger configured for delivering heat generated by the heating resistor to an airflow, and a rectangular frame surrounding the heating resistor and the heat exchanger, the frame having openings in opposed frame legs; and
    electrical connection elements;
    wherein the openings in frame legs of adjacent heating modules face one another and the electrical connection elements extend through the openings and electrically connect the heating modules to one another.

2. The heating device according to claim 1, wherein each heating module has at least two male connection elements which protrude from the openings in one of the frame legs.

3. The heating device according to claim 1, wherein an overall frame surrounds all heating modules of the heating device.

4. The heating device according to claim 3, wherein the heating unit comprises at least two heating units, each of which comprises a plurality of heating modules, and the overall frame has one or more webs, each of which is arranged between two adjacent heating units.

5. The heating device according to claim 1, wherein the connection elements comprise at least two male plug contacts protruding from the openings in one of the frame legs of each module, the connection elements further comprising female connection elements, wherein all heating modules of a heating unit are connectable to a voltage source via the male plug contacts of one of the heating modules of said heating unit, and the male plug contacts of all other heating modules of said heating unit engage female plug contacts arranged in one of the other heating modules of the heating unit.

6. The heating device according to claim 5, wherein in each frame of each module the female plug contacts are arranged in the frame leg that is opposite the frame leg in which the male plug contacts are arranged.

7. The heating device according to claim 6, wherein the female plug contacts are formed as contact elements which protrude from the openings in the frame leg in which they are arranged.

8. The heating device according to claim 1, wherein the heat exchangers of the heating modules are formed of corrugated sheet metal.

9. The heating device according to claim 1, wherein the heating resistor of each heating module is electrically connected to one of the connection elements through one or more of the heat exchangers.

10. A heating module for a heating device, comprising:
    a heating resistor;
    a heat exchanger for dissipating heat generated by the heating resistor to an airflow;
    a rectangular frame which surrounds the heating resistor and the heat exchanger, the rectangular frame having a first frame leg and a second frame leg arranged opposite the first frame leg; and
    at least two male plug contacts which protrude from first openings in the first frame leg and at least two female plug contacts arranged in second openings in the second frame leg, the female plug contacts configured to mate with respective male plug contacts of an adjacent heating module.

11. The heating module of claim 10, wherein the female plug contacts are formed as contact elements which protrude from the second openings in the second frame leg.

12. The heating module of claim 10, wherein the heating resistor comprises at least two heating resistors and the heat exchanger comprises at least two heat exchangers.

13. The heating module of claim 10, wherein the heating resistor is electrically connected to one of the plug contacts via the heat exchanger.

* * * * *